June 16, 1959     F. X. LINDER     2,891,216
COMPENSATOR FOR MAGNETIC DETECTION EQUIPMENT
Filed Jan. 16, 1956

INVENTOR
FRANK X. LINDER

BY

ATTORNEYS

United States Patent Office 2,891,216
Patented June 16, 1959

2,891,216

COMPENSATOR FOR MAGNETIC DETECTION EQUIPMENT

Frank X. Linder, Baltimore, Md., assignor, by mesne assignments, to the United States of America as represented by the Secretary of the Navy Application January 16, 1956, Serial No. 559,498

4 Claims. (Cl. 324—43)

This invention relates to magnetically actuated signal detection equipment with special application to compensators for interfering magnetic noise.

In certain applications, as, for example, in aircraft, magnetic sensing apparatus is subject to extraneous or stray magnetic effects. Specifically, magnetometers employed on aircraft for submarine detection are subject to severe signal distortion due to the sum of magnetic impulses arising from the aircraft equipment or from external forces acting on the metal parts of the airplane. For example, noise results from permanent magnets, from magnetism in metal parts induced by orientation in the earth's magnetic field, from eddy currents induced in sheet metal surfaces of the airplane during rotational maneuvers, and from current flow in single wire direct current power circuits using the aircraft structure as the negative return path.

A primary object of the invention, therefore, is to provide an electrical system in which stray magnetic effects from the aircraft are nullified, permitting undistorted reception from an external point, such as a submarine. An object also, is to provide compensating apparatus for undesired magnetic effects on signal equipment which is simple in principle, which is independent of variation in external magnetic flux and which is effective in operation.

Figure 1:
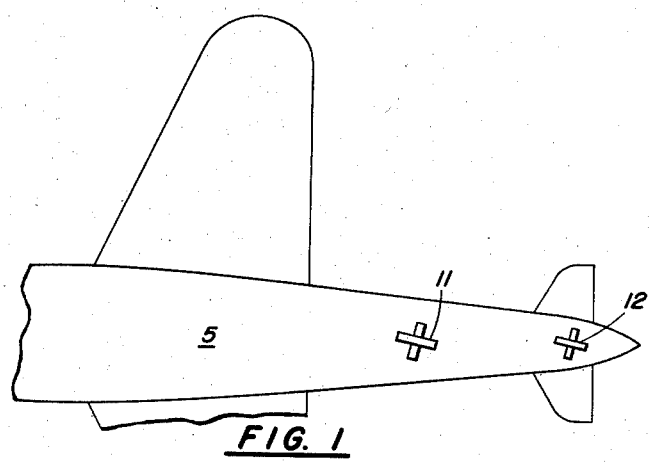
Figure 2:
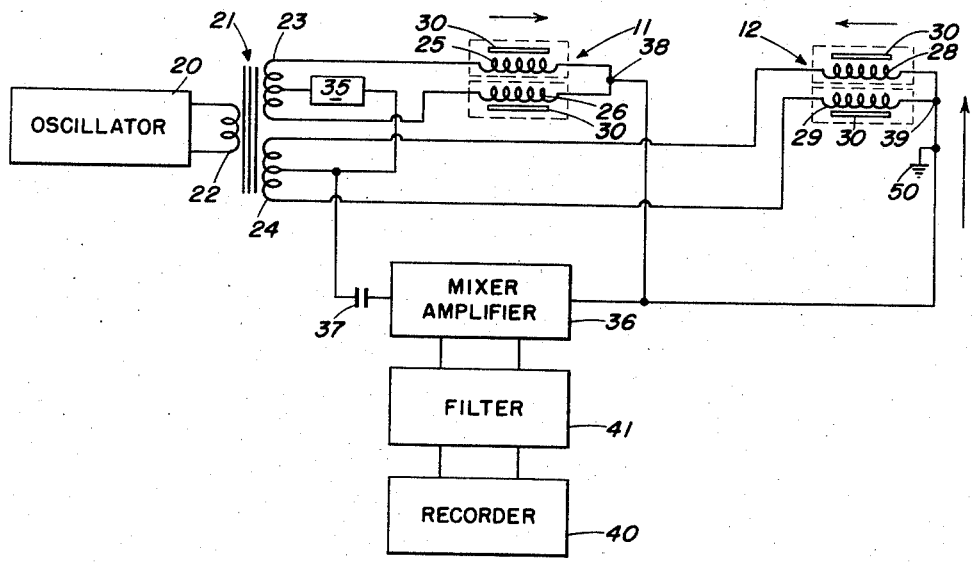

Other objects and many of the attendant advantages of this invention will be readily appreciated as the same becomes better understood by reference to the following detailed description when considered in connection with the accompanying drawings wherein:

Fig. 1 is a view of a fragment of an aircraft showing location of two magnetometers on the fuselage; and Fig. 2 is a schematic block and wiring diagram indicating the magnetometer circuits.

In order to simplify the disclosure, the apparatus is described as applied to aircraft designed for submarine detection. Since aircraft is supplied with miscellaneous electrical equipment which together form a composite flow of electromagnetic emanations in use, it is evident that the submarine detecting magnetometers are constantly subject to magnetic noise or disturbances.

To neutralize this extraneous disturbance, two magnetometers are used, these units being spaced in alinement with each other and in general alinement with the disturbance along an aircraft fuselage 5, as shown at 11 and 12 in Fig. 1. These magnetometers are sensitive to signals arising from the submarine area, and, also, are sensitive to the magnetic composite noise emanation from the aircraft itself. Since magnetometer 11 is closer to the noise center, and the magnetic effect varies as the inverse cube of the distance between a disturbance source and the instrument, the disturbing effect on magnetometer 11 is notably greater than on magnetometer 12, a ratio of 2 to 1 being readily obtainable. However, if the magnetic noise received by magnetometer 11 is attenuated to a value equal to that received by magnetometer 12 and the phasing of the two magnetometers is opposite, the noise as received by the magnetometers from the aircraft is neutralized. With this accomplished, and since there is no attenuation of magnetometer 12, target signals will be received without noise disturbance. Any standard type magnetometer may be used, such as is in use by the United States Navy, employing a core saturable at 400 cycles per second. The output of the magnetometer after amplification and detection is passed through a low frequency filter.

Fig. 2 shows a schematic arrangement of equipment to accomplish the above described results. The oscillator 20 supplies current to transformer 21 which includes a primary coil 22 and secondary coils 23 and 24. Magnetometer 11 includes two induction coils 25 and 26 connected in series with transformer secondary coil 23. Magnetometer 12, similarly, is formed of induction coils 28 and 29 connected in series with transformer secondary coil 24. Each induction coil is provided with a core 30. The windings of the induction coils in magnetometers 11 and 12 are oppositely phased so that with equal current flow the electrical effects are neutralized.

In addition to the elements specified, the circuitry includes an attenuator 35, tied in conventionally with magnetometer 11 by a series circuit leading from center taps in transformer secondaries 23 and 24, a mixer amplifier unit 36 connected at one end through a capacitor 37 to the tap line of transformer secondaries 23 and 24 and at the other end to circuit points 38 and 39 between the magnetometer induction coils 25, 26 and 28, 29 respectively. A recorder 40 for registering target signals is connected to the mixer-amplifier unit 36 through a low frequency filter 41. Magnetometer 12, also, is grounded at 50.

In operation, the system is first adjusted for the interference field, the noise signals received by magnetometer 11 being attenuated to bring about equality of power output as compared to magnetometer 12, this resulting in cancellation of the noise disturbance. The two magnetometers now receive submarine target signals of equal intensity, since the magnetometers lie normally in a horizontal plane and, in any event, the distance from the magnetometers to the target area is large relative to any discrepancy between the two magnetometer-target distances. Since magnetometer 12 has not been attenuated there is a net signal which is effective on recorder 40 for observation. In this way the system is independent of interference noise, the recorder registering only target signals.

While, for explanatory purposes, the description has been related to aircraft it is obvious that the equipment can be applied to other apparatus. Also, while magnetometers are specified, other detection devices such as electrical wave detectors or mechanical detectors may be employed utilizing equivalent procedure. It is apparent also that while the magnetometers are described as spaced on the aircraft fuselage, other locations such as the wing may, under some circumstances, be feasible. It is further indicated that the operational procedure may readily be modified in that instead of attenuating noise effect in unit 11, the effect in unit 12 may be magnified to equality with unit 11.

Obviously many modifications and variations of the present invention are possible in the light of the above teachings. It is therefore to be understood that within the scope of the appended claims the invention may be practiced otherwise than as specifically described.

What is claimed is:

1. In detection apparatus sensitive to magnetic impulses received from a signal, a support, a source of magnetic disturbance on said support, a first magnetometer on said support spaced from said disturbance source at a determinable distance, a second magnetometer on said support spaced from said disturbance source at a distance greater than said determinable distance, said magnetometers being electrically interconnected and phased in opposition, means for equalizing the power flow in said magnetometers, means for supporting said magnetometers in equi-spaced relation to a signal, and means connected to said magnetometers for identifying a signal as received by said magnetometers.

2. The detection apparatus as defined in claim 1, with said magnetometers being placed on said support in alinement with each other and with said source of magnetic disturbance.

3. In signal detecting apparatus, a support, a source of magnetic disturbance on said support, a first signal detecting unit mounted on said support spaced from said disturbance source at a determinable distance, a second signal detecting unit mounted on said support spaced from said disturbance source at a distance greater than said determinable distance, said first and second signal detectors spaced approximately equidistant from the signal to be detected, means connected to one of said units for nullifying the effects of the said disturbance in both units without disturbing the reception from said signal, and means connected to said units for identifying said signal.

4. In a signal detecting apparatus, a support, a source of magnetic disturbance on said support, a transformer having a primary coil and first and second secondary coils, each of said secondary coils having a center tap, an oscillator having an output connected to said primary coil for supplying current thereto, a first magnetometer including two induction coils connected in series with said first secondary coil, a second magnetometer including two induction coils connected in series with said second secondary coil, the series connected coils of each of said magnetometers being oppositely phased so that with equal current flow therein the electrical effects are neutralized, said first magnetometer being mounted on said support spaced from said disturbance source at a determinable distance, said second magnetometer being mounted on said support spaced from said disturbance source at a distance greater than said determinable distance, said first and second magnetometers spaced approximately equidistant from the signal to be detected, attenuator means connected between the center taps of said seondary coils for nullifying the effects of said disturbance in both magnetometers without disturbing the reception from said signal, and means connected to said magnetometers for identifying said signal.

References Cited in the file of this patent

UNITED STATES PATENTS

| | | |
|---|---|---|
| 2,483,417 | Johnson | Oct. 4, 1949 |
| 2,519,094 | Zuschlag | Aug. 15, 1950 |
| 2,535,068 | Johnson | Dec. 26, 1950 |
| 2,725,551 | Anderson | Nov. 29, 1955 |